(12) United States Patent
Onozaki

(10) Patent No.: US 9,122,040 B2
(45) Date of Patent: Sep. 1, 2015

(54) SUPERWIDE-ANGLE LENS SYSTEM

(71) Applicant: RICOH IMAGING COMPANY, LTD., Tokyo (JP)

(72) Inventor: Tatsuyuki Onozaki, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/077,758

(22) Filed: Nov. 12, 2013

(65) Prior Publication Data

US 2014/0153118 A1    Jun. 5, 2014

(30) Foreign Application Priority Data

Dec. 3, 2012 (JP) .................... 2012-264253

(51) Int. Cl.
 *G02B 9/04* (2006.01)
 *G02B 13/06* (2006.01)
 *G02B 13/18* (2006.01)
(52) U.S. Cl.
 CPC ............... *G02B 13/06* (2013.01); *G02B 13/18* (2013.01)
(58) Field of Classification Search
 CPC ...................................................... G02B 15/173
 USPC ............................................................ 359/795
 See application file for complete search history.

(56) References Cited

U.S. PATENT DOCUMENTS 7,196,853 B2 *  3/2007  Nishio et al. ................. 359/690

FOREIGN PATENT DOCUMENTS

| JP | 2004-226740 | 8/2004 |
| JP | 2007-94173  | 4/2007 |
| JP | 2008-151949 | 7/2008 |

* cited by examiner

*Primary Examiner* — James Jones
(74) *Attorney, Agent, or Firm* — Greenblum & Bernstein P.L.C.

(57) ABSTRACT

A superwide-angle lens system includes a positive front lens group and a negative rear lens group, in that order from the object side, wherein the negative rear lens group serves as a focusing lens group that is moved in the optical axis direction when focusing on an object at infinity to an object at a finite distance. The following condition (1) is satisfied:

$$1.1 < mR < 2.0 \qquad (1),$$

wherein mR designates the lateral magnification of the negative rear lens group when focusing on an object at infinity.

6 Claims, 10 Drawing Sheets

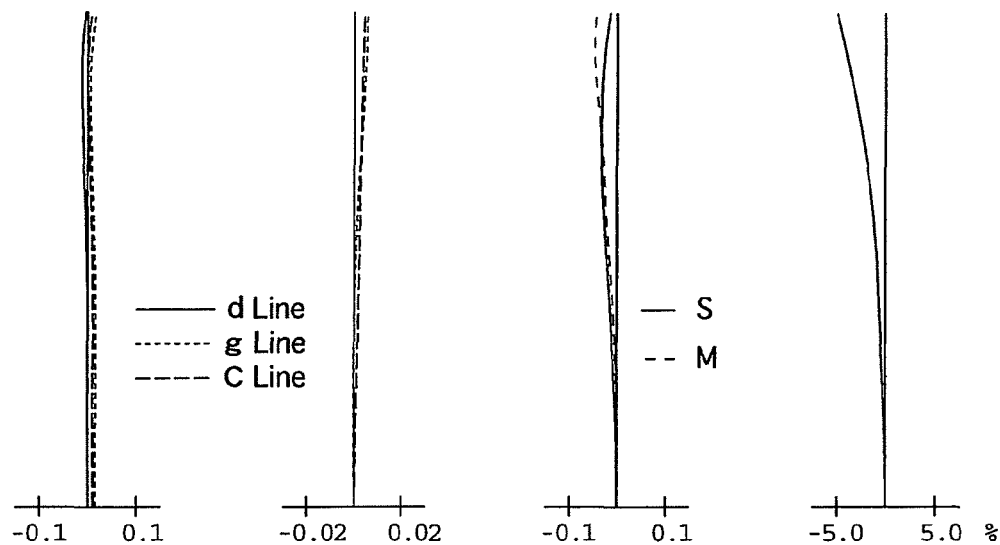
Fig. 2A  FNO.=1:1.4  SPHERICAL ABERRATION CHROMATIC ABERRATION
Fig. 2B  W=50.1  LATERAL CHROMATIC ABERRATION
Fig. 2C  W=50.1  ASTIGMATISM
Fig. 2D  W=50.1  DISTORTION
Fig. 3A  Y= 0.00
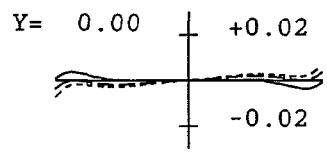
Fig. 3B  Y= 2.82
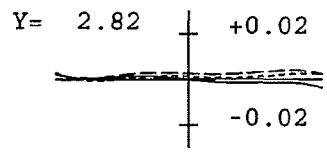
Fig. 3C  Y= 3.29
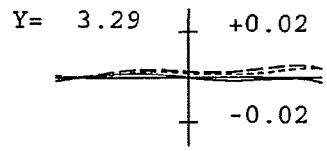
Fig. 3D  Y= 5.00
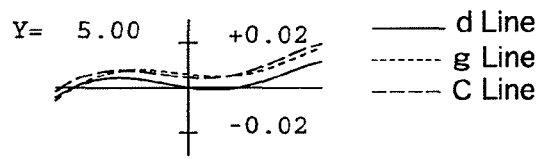

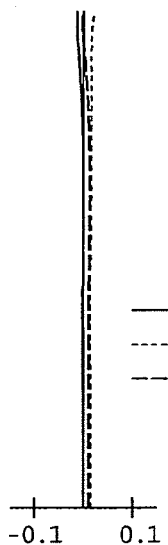
Fig. 5A
FNO.=1:1.4
d Line
g Line
C Line
-0.1  0.1
SPHERICAL ABERRATION
CHROMATIC ABERRATION
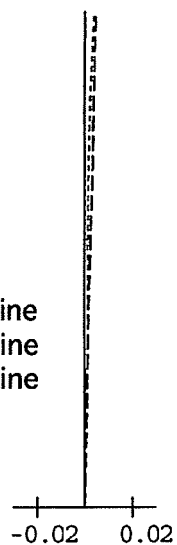
Fig. 5B
W=50.8
-0.02  0.02
LATERAL CHROMATIC ABERRATION
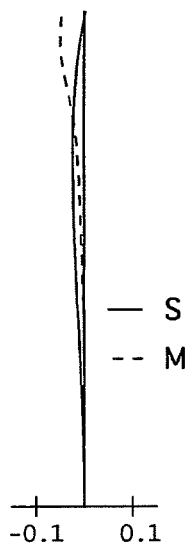
Fig. 5C
W=50.8
— S
-- M
-0.1  0.1
ASTIGMATISM
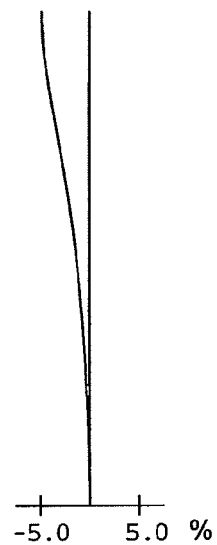
Fig. 5D
W=50.8
-5.0  5.0 %
DISTORTION
Fig. 6A
Y= 0.00
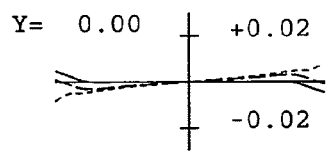
Fig. 6B
Y= 2.82
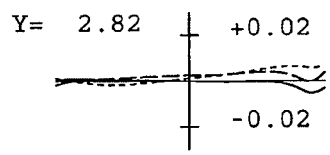
Fig. 6C
Y= 3.29
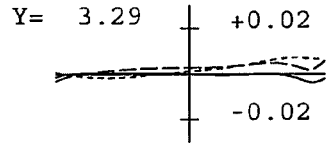
Fig. 6D
Y= 5.00
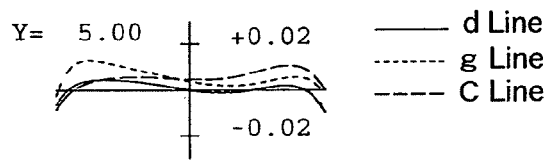
d Line
g Line
C Line

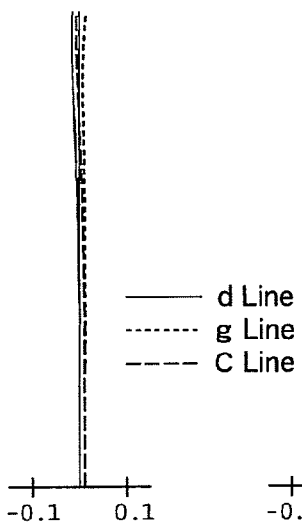
Fig. 8A
FNO.=1:1.4
-0.1  0.1
SPHERICAL
ABERRATION
CHROMATIC
ABERRATION
— d Line
------ g Line
---- C Line
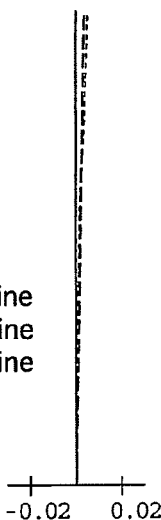
Fig. 8B
W=50.1
-0.02  0.02
LATERAL
CHROMATIC
ABERRATION
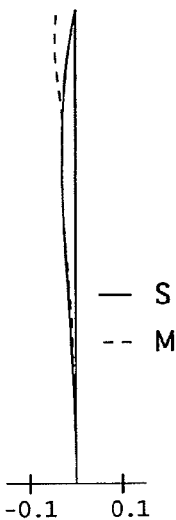
Fig. 8C
W=50.1
-0.1  0.1
ASTIGMATISM
— S
-- M
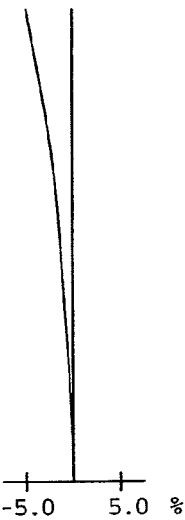
Fig. 8D
W=50.1
-5.0  5.0 %
DISTORTION
Fig. 9A
Y= 0.00  +0.02
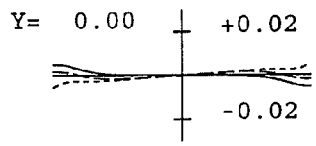
-0.02
Fig. 9B
Y= 2.82  +0.02
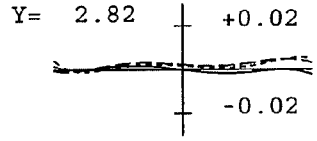
-0.02
Fig. 9C
Y= 3.29  +0.02
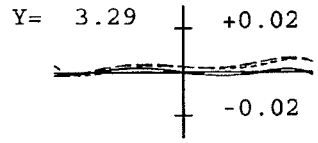
-0.02
Fig. 9D
Y= 5.00  +0.02
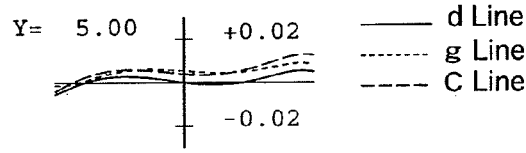
-0.02
— d Line
------ g Line
---- C Line

SPHERICAL ABERRATION CHROMATIC ABERRATION

LATERAL CHROMATIC ABERRATION

ASTIGMATISM

DISTORTION

SUPERWIDE-ANGLE LENS SYSTEM

BACKGROUND OF THE INVENTION

1. Field of the Invention

The present invention relates to a superwide-angle lens system, and in particular relates to a rear focusing large-aperture superwide-angle lens system that is suitable for use in an electronic still camera, in which a small solid-state image sensor is installed.

2. Description of Related Art

In the related art, a rear focusing superwide-angle lens system has been proposed in which the lens group that is provided closest to the image side is moved in the optical axis direction when focusing on an object at infinity to an object at a finite distance. For example, Japanese Unexamined Patent Publication Nos. 2004-226740 and 2008-151949 each disclose a superwide-angle lens system which focuses on an object at infinity to an object at a finite distance by moving a positive lens group that is provided at the rear end of the optical system in the optical axis direction. A rear focusing lens system enables a rapid focusing operation due to the focusing lens group (movable lens group) having a small effective diameter and being light-weight.

On the other hand, miniature electronic still cameras, in which an image sensor that is sufficiently smaller than a conventional 35 mm or APS frame size, have been developed. In recent years, higher specifications, especially in regard to a larger aperture diameter, have been in demand in optical systems used in such miniature electronic still cameras. Increasing the aperture diameter of an optical system is equivalent to increasing the effective aperture diameter of the lens groups, through which the axial light bundle passes. However, if the diameter and the weight of the focusing lens group increase, the burden on the autofocus drive mechanism increases. Furthermore, it also becomes difficult to attain a high imaging quality.

Such a superwide-angle lens system used in a miniature electronic still camera can be achieved by scaling down the optical system of the superwide-angle lens system that is suitable for a conventional large-sized image sensor such as those disclosed in Japanese Unexamined Patent Publication Nos. 2004-226740 and 2008-151949. However, these optical systems both use four or more lens elements in the focusing lens group, so that the weight of the focusing lens group is large. Furthermore, the effective diameter of the focusing lens group is too large to serve as a lens group for use in the above-described miniature camera. Whereas, if attempts are made to reduce the number of lens elements of the focusing lens group in order to reduce the burden on the autofocus drive mechanism and achieve further miniaturization of the lens system, the amount of movement of the focusing lens group during focusing increases, and it becomes difficult to achieve a high imaging quality.

SUMMARY OF THE INVENTION

The present invention has been devised in consideration of the above-discussed problems and provides a superwide-angle lens system which can reduce the burden on the autofocus drive mechanism by reducing the number of lens elements and effective diameter of the focusing lens group, and achieves a suitable focusing-lens-group movement amount and an optimum optical quality by optimally setting the focusing sensitivity of the focusing lens group.

According to an aspect of the present invention, a superwide-angle lens system is provided, including a positive front lens group and a negative rear lens group, in that order from the object side, wherein the negative rear lens group serves as a focusing lens group that is moved in the optical axis direction when focusing on an object at infinity to an object at a finite distance. The following condition (1) is satisfied:

$$1.1 < mR < 2.0 \qquad (1),$$

wherein mR designates the lateral magnification of the negative rear lens group when focusing on an object at infinity.

It is desirable for the superwide-angle lens system of the present invention to satisfy the following condition (1') from within the range of condition (1):

$$1.1 < mR < 1.3 \qquad (1')$$

It is desirable for the following condition (2) to be satisfied:

$$-30 < fR/fF < -11 \qquad (2),$$

wherein fR designates the focal length of the negative rear lens group, and fF designates the focal length of the positive front lens group.

It is desirable for the superwide-angle lens system of the present invention to satisfy the following condition (2') from within the range of condition (2):

$$-30 < fR/fF < -15 \qquad (2')$$

The positive front lens group can include at least two negative single lens elements which are consecutively provided from a position closest to the object side. In such a case, it is desirable for the following condition (3) to be satisfied:

$$-2.0 < fn/fF < -1.3 \qquad (3),$$

wherein fn designates the combined focal length of the at least two negative single lens elements which are consecutively provided from the position closest to the object side within the positive front lens group, and fF designates the focal length of the positive front lens group.

It is desirable for the negative rear lens group to include a cemented lens provided with one negative lens element and one positive lens element, in that order from the object side or vice versa.

It is desirable for the following condition (4) to be satisfied:

$$20 < vd < 35 \qquad (4),$$

wherein vd designates the Abbe number with respect to the d-line of the positive lens element provided closest to the object side within the positive front lens group.

In another embodiment of the present invention, a superwide-angle lens system is provided, including a positive front lens group and a negative rear lens group, in that order from the object side, wherein the negative rear lens group serves as a focusing lens group that is moved in the optical axis direction when focusing on an object at infinity to an object at a finite distance. The following condition (2) is satisfied:

$$-30 < fR/fF < -11 \qquad (2),$$

wherein fR designates the focal length of the negative rear lens group, and fF designates the focal length of the positive front lens group.

In another embodiment of the present invention, a superwide-angle lens system is provided, including a positive front lens group and a negative rear lens group, in that order from the object side, wherein the negative rear lens group serves as a focusing lens group that is moved in the optical axis direction when focusing on an object at infinity to an object at a finite distance. The positive front lens group include at least two negative single lens elements which are consecutively provided from a position closest to the object side. The following condition (3) is satisfied:

$$-2.0 < fn/fF < -1.3 \qquad (3),$$

wherein fn designates the combined focal length of the at least two negative single lens elements which are consecutively provided from the position closest to the object side within the positive front lens group, and fF designates the focal length of the positive front lens group.

According to the present invention, a superwide-angle lens system is achieved which can reduce the burden on the auto-focus drive mechanism by reducing the number of lens elements and effective diameter of the focusing lens group, and achieve a suitable focusing-lens-group movement amount and an optimum optical quality by optimally setting the focusing sensitivity of the focusing lens group.

The present disclosure relates to subject matter contained in Japanese Patent Application No. 2012-264253 (filed on Dec. 3, 2012) which is expressly incorporated herein in its entirety.

BRIEF DESCRIPTION OF THE DRAWINGS

The present invention will be discussed below in detail with reference to the accompanying drawings, in which:

FIGS. 2A, 2B, 2C and 2D show various aberrations that occurred in the lens arrangement shown in FIG. 1;

FIGS. 3A, 3B, 3C and 3D show lateral aberrations that occurred in the lens arrangement shown in FIG. 1;

FIGS. 5A, 5B, 5C and 5D show various aberrations that occurred in the lens arrangement shown in FIG. 4;

FIGS. 6A, 6B, 6C and 6D show lateral aberrations that occurred in the lens arrangement shown in FIG. 4;

FIGS. 8A, 8B, 8C and 8D show various aberrations that occurred in the lens arrangement shown in FIG. 7;

FIGS. 9A, 9B, 9C and 9D show lateral aberrations that occurred in the lens arrangement shown in FIG. 7;

DESCRIPTION OF THE EMBODIMENTS

Figure 1:
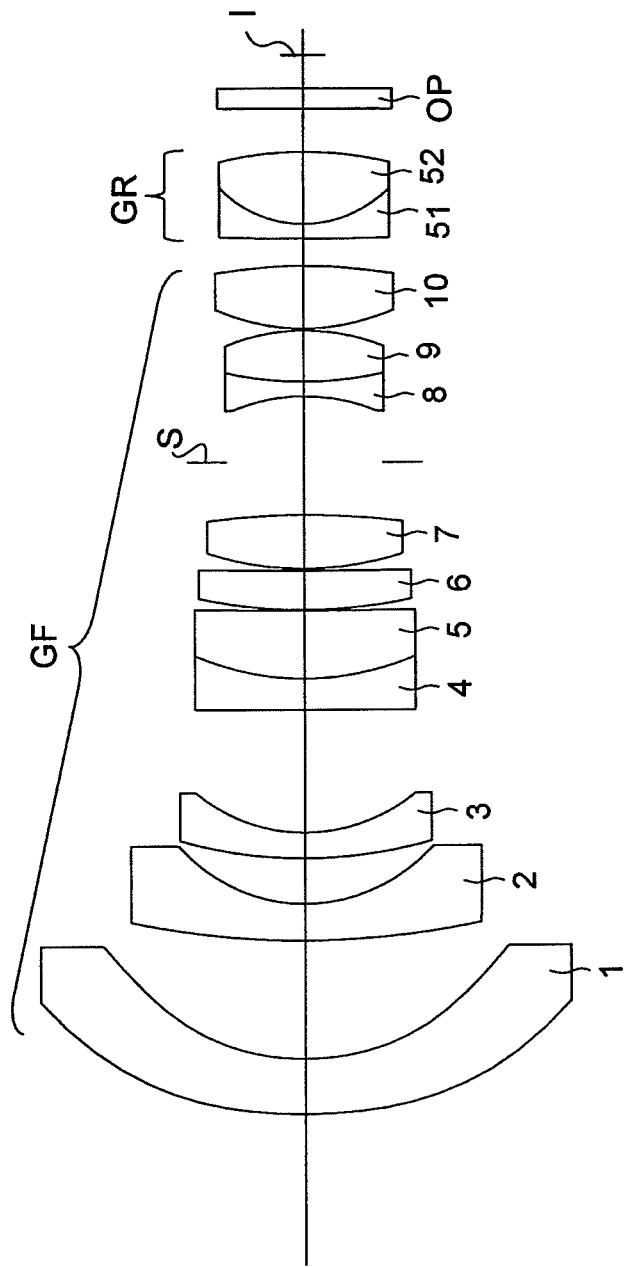
FIG. 1 shows a lens arrangement of a first numerical embodiment of a superwide-angle lens system, according to the present invention, when focused on an object at infinity.

The superwide-angle lens system of the present invention is configured of a positive front lens group GF and a negative rear lens group GR, in that order from the object side, as shown in FIGS. 1, 4, 7, 10 and 13 of the first through fifth numerical embodiments, respectively. An optical filter OP is provided between the negative rear lens group GR and the imaging plane I.

In the first numerical embodiment, the positive front lens group GF is configured of a negative lens element 1, a negative lens element 2, a negative lens element 3, a cemented lens provided with a negative lens element 4 and a positive lens element 5; a positive lens element 6, a positive lens element 7, a diaphragm S, a cemented lens provided with a negative lens element 8 and a positive lens element 9; and a positive lens element 10, in that order from the object side (eight lens groups, ten lens elements). An aspherical surface is formed on each side of the negative lens element 1 which is provided closest to the object side within the front lens group GF, and an aspherical surface is formed on each side of the positive lens element 10 which is provided closest to the image side within the front lens group GF.

In the second and fourth numerical embodiments, the positive front lens group GF is configured of a negative lens element 11, a negative lens element 12, a cemented lens provided with a positive lens element 13 and a negative lens element 14; a negative lens element 15, a positive lens element 16, a positive lens element 17, a diaphragm S, a cemented lens provided with a negative lens element 18 and a positive lens element 19; and a positive lens element 20, in that order from the object side (eight lens groups, ten lens elements). An aspherical surface is formed on each side of the negative lens element 11 which is provided closest to the object side within the front lens group GF, and an aspherical surface is formed on each side of the positive lens element 20 which is provided closest to the image side within the front lens group GF.

In the third numerical embodiment, the positive front lens group GF is configured of a negative lens element 21, a negative lens element 22, a negative lens element 23, a positive lens element 24, a negative lens element 25, a positive lens element 26, a diaphragm S, a cemented lens provided with a negative lens element 27 and a positive lens element 28; and a positive lens element 29, in that order from the object side (eight lens groups, nine lens elements). An aspherical surface is formed on each side of the negative lens element 21 which is provided closest to the object side within the front lens group GF, and an aspherical surface is formed on each side of the positive lens element 29 which is provided closest to the image side within the front lens group GF.

In the fifth numerical embodiment, the positive front lens group GF is configured of a negative lens element 31, a negative lens element 32, a negative lens element 33, a cemented lens provided with a positive lens element 34 and a negative lens element 35; a negative lens element 36, a positive lens element 37, a positive lens element 38, a diaphragm S, a cemented lens provided with a negative lens element 39 and a positive lens element 40; and a positive lens element 41, in that order from the object side (nine lens groups, eleven lens elements). An aspherical surface is formed on each side of the negative lens element 32 which is provided second from the closest to the object side within the front lens group GF, and an aspherical surface is formed on each side of the positive lens element 41 which is provided closest to the image side within the front lens group GF.

In each of the first through fifth numerical embodiments, the negative rear lens group GR is configured of a cemented lens provided with a negative lens element 51 and a positive lens element 52, in that order from the object side. The negative rear lens group GR serves as a focusing lens group which is moved in the optical axis direction (toward the image side) when focusing on at object at infinity to an object at a finite distance.

The superwide-angle lens system of the illustrated embodiments is a rear focusing type which covers an angle-of-view of 90 degrees or more, is configured of the positive front lens group GF and the negative rear lens group GR, in that order from the object side, and in which the negative rear lens group GR is a focusing lens group which is moved in the optical axis direction (toward the image side) when focusing on at object at infinity to an object at a finite distance. Accordingly, by making the negative rear lens group GR, which has fewer lens elements compared to the positive front lens group GF, has a smaller effective diameter and is lighter than the positive front lens group GF, serve as a focusing lens group, a rapid focusing operation can be achieved.

By configuring the negative rear lens group GR, which serves as the focusing lens group, as a cemented lens provided with a negative lens element 51 and a positive lens element 52, in that order from the object side, various aberrations such as spherical aberration and chromatic aberration which occur during focusing can be favorably corrected, so that a superior optical quality can be achieved. Furthermore, decentration occurring between the negative lens element 51 and the positive lens element 52 can be suppressed, so that deterioration of the optical quality via the manufacturing process can be prevented. It should be noted that the same effect can be obtained even if the order of the negative lens element and the positive lens element of the negative rear lens group GR (focusing lens group) is switched so that the negative rear lens group GR is configured of a positive lens element and a negative lens element, in that order from the object side.

Condition (1) specifies the lateral magnification of the negative rear lens group GR when focused on an object at infinity, and is for optimally setting the focusing sensitivity of the negative rear lens group GR (focusing lens group). The focusing sensitivity is the ratio of the focal adjustment amount to the focusing movement amount of the focusing lens group, and can be represented as $K=1-mR^2$. By satisfying condition (1), a high-precision autofocus control can be achieved, the burden on autofocus drive mechanism is reduced, and miniaturization and reduction in weight of the lens system can be achieved.

If the upper limit of condition (1) is exceeded, the focusing sensitivity of the negative rear lens group (focusing lens group) GR becomes too high, so that it becomes difficult to carry out a high-precision autofocus control.

If the lower limit of condition (1) is exceeded, the focusing sensitivity of the negative rear lens group (focusing lens group) GR becomes too low, so that as a result of the focusing movement amount of the focusing lens group becoming large with respect to the focal adjustment amount, the burden on the autofocus drive mechanism increases. Furthermore, the front of the lens system (positive front lens group GF) increases in diameter, increasing the weight of the lens elements and increasing the cost thereof.

Condition (2) specifies the ratio of the refractive power of the positive front lens group GF to the refractive power of the negative rear lens group GR. By satisfying condition (2), fluctuations in aberrations, such as spherical aberration, field curvature and lateral chromatic aberration which occur during focusing can be suppressed, thereby achieving a superior optical quality while achieving miniaturization and reduction in weight of the lens system.

If the upper limit of condition (2) is exceeded, the entire length of the lens system increases, the diameter of the front end of the lens system increases in size in order to collect sufficient peripheral light rays, and leads to the weight and cost of the lens system increasing, which is undesirable.

If the lower limit of condition (2) is exceeded, it becomes difficult to suppress aberration fluctuations of spherical aberration, field curvature and lateral chromatic aberration that occur during focusing, so that the optical quality deteriorates.

In the superwide-angle lens system of the illustrated embodiments, the positive front lens group GF is provided with at least two negative single lens elements which are consecutively provided from a position closest to the object side (the negative lens elements 1 through 3 in the first numerical embodiment, the negative lens elements 11 and 12 in the second and fourth numerical embodiments, the negative lens elements 21 through 23 in the third numerical embodiment, and negative lens elements 31 through 33 in the fifth numerical embodiment). In other words, the positive front lens group GF has a strong positive refractive power overall while having a retrofocus arrangement in which a negative refractive power is concentrated at the front end (object side) of the positive front lens group GF and a positive refractive power is concentrated at the rear end (image side) of the positive front lens group GF.

Condition (3) specifies the ratio of the combined focal length of the at least two negative single lens elements that are consecutively provided from a position closest to the object side within the positive front lens group GF to the focal length of the positive front lens group GF. By satisfying condition (3), spherical aberrations can be favorably corrected while suppressing occurrence of astigmatism, so that a superior optical quality can be achieved.

If the upper limit of condition (3) is exceeded, correction of spherical aberrations becomes difficult, so that the optical quality deteriorates.

If the lower limit of condition (3) is exceeded, the astigmatism increases, thereby deteriorating the optical quality.

Condition (4) specifies the Abbe number with respect to the d-line of the positive lens element that is provided closest to the object side within the positive front lens group GF (the positive lens element 5 in the first numerical embodiment, the positive lens element 13 in the second and fourth numerical embodiment, the positive lens element 24 in the third numerical embodiment, and the positive lens element 34 in the fifth numerical embodiment). By satisfying condition (4), the lateral chromatic aberration can be favorably corrected.

If the upper limit of condition (4) is exceeded, the lateral chromatic aberration becomes insufficiently corrected, so that the optical quality deteriorates.

If the lower limit of condition (4) is exceeded, the lateral chromatic aberrations become overcorrected, so that the optical quality deteriorates.

Specific first through fifth numerical embodiments will be herein discussed. In the aberration diagrams and the tables, the d-line, g-line and C-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, R designates the radius of curvature, d designates the lens thickness or distance between lenses, N(d) designates the refractive index at the d-line, and vd designates the Abbe number with respect to the d-line. The unit used for the various lengths is defined in millimeters (mm).

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12}$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

Numerical Embodiment 1

FIGS. 1 through 3D and Tables 1 through 3 show a first numerical embodiment of the superwide-angle lens system according to the present invention. FIG. 1 shows a lens arrangement of the first numerical embodiment of the superwide-angle lens system when focused on an object at infinity. FIGS. 2A, 2B, 2C and 2D show various aberrations that occurred in the lens arrangement shown in FIG. 1. FIGS. 3A, 3B, 3C and 3D show lateral aberrations that occurred in the lens arrangement shown in FIG. 1. Table 1 shows the lens surface data. Table 2 shows the aspherical surface data. Table 3 shows various lens system data.

The superwide-angle lens system of the first numerical embodiment is configured of a positive front lens group GF and a negative rear lens group GR, in that order from the object side. An optical filter OP is provided between the negative rear lens group GR and the imaging plane I.

The positive front lens group GF is configured of a negative meniscus lens element 1 having a convex surface on the object side, a negative meniscus lens element 2 having a convex surface on the object side, a negative meniscus lens element 3 having a convex surface on the object side, a cemented lens provided with a negative meniscus lens element 4 having a convex surface on the object side and a positive meniscus lens element 5 having a convex surface on the object side; a positive meniscus lens element 6 having a convex surface on the object side, a biconvex positive lens element 7, a diaphragm S, a cemented lens provided with a biconcave negative lens element 8 and a biconvex positive lens element 9; and a biconvex positive lens element 10, in that order from the object side (eight lens groups, ten lens elements). An aspherical surface is formed on each side of the negative meniscus lens element 1 which is provided closest to the object side within the front lens group GF, and an aspherical surface is formed on each side of the biconvex positive lens element 10 which is provided closest to the image side within the front lens group GF.

The negative rear lens group GR is configured of a cemented lens provided with a negative meniscus lens element 51 having a convex surface on the object side and a biconvex positive lens element 52, in that order from the object side. The negative rear lens group GR serves as a focusing lens group which is moved in the optical axis direction (toward the image side) when focusing on an object at infinity to an object at a finite distance.

TABLE 1

SURFACE DATA

| Surf. No. | R | d | N(d) | ν(d) |
|---|---|---|---|---|
| 1* | 32.831 | 3.000 | 1.69350 | 53.2 |
| 2* | 14.514 | 6.441 | | |
| 3 | 49.084 | 2.000 | 1.72916 | 54.7 |
| 4 | 9.668 | 2.500 | | |
| 5 | 26.565 | 1.400 | 1.77250 | 49.6 |
| 6 | 9.840 | 6.749 | | |
| 7 | 2347.999 | 1.694 | 1.51742 | 52.2 |
| 8 | 16.068 | 3.742 | 1.80610 | 33.3 |
| 9 | 553.547 | 0.020 | | |
| 10 | 29.029 | 2.155 | 1.75500 | 52.3 |
| 11 | 608.326 | 0.100 | | |
| 12 | 18.073 | 2.968 | 1.48749 | 70.4 |
| 13 | −44.066 | 2.869 | | |
| 14(Diaphragm) | ∞ | 3.581 | | |
| 15 | −11.026 | 0.800 | 1.74077 | 27.8 |
| 16 | 20.852 | 2.796 | 1.49700 | 81.6 |
| 17 | −12.164 | 0.100 | | |
| 18* | 12.234 | 3.430 | 1.85135 | 40.1 |
| 19* | −24.722 | 1.455 | | |
| 20 | 145.412 | 0.800 | 1.90366 | 31.3 |
| 21 | 6.870 | 3.920 | 1.58913 | 61.2 |
| 22 | −21.184 | 3.419 | | |
| 23 | ∞ | 1.050 | 1.51633 | 64.1 |
| 24 | ∞ | — | | |

TABLE 2

Aspherical Surface Data (Coefficients not shown are zero (0.0)):

| Surf. No. | K | A4 | A6 | A8 |
|---|---|---|---|---|
| 1 | 0.000 | 0.8729E−04 | −0.2347E−06 | 0.3800E−09 |
| 2 | 0.000 | 0.9764E−04 | 0.5340E−07 | −0.3798E−08 |
| 18 | 0.000 | −0.9270E−04 | 0.8367E−06 | |
| 19 | 0.000 | 0.1505E−03 | 0.1694E−06 | |

TABLE 3

LENS SYSTEM DATA

| | |
|---|---|
| FNO. | 1.4 |
| f | 4.40 |
| W | 50.1 |
| Y | 5.00 |
| fB | 2.55 |
| L | 59.54 |

Numerical Embodiment 2

Figure 4:
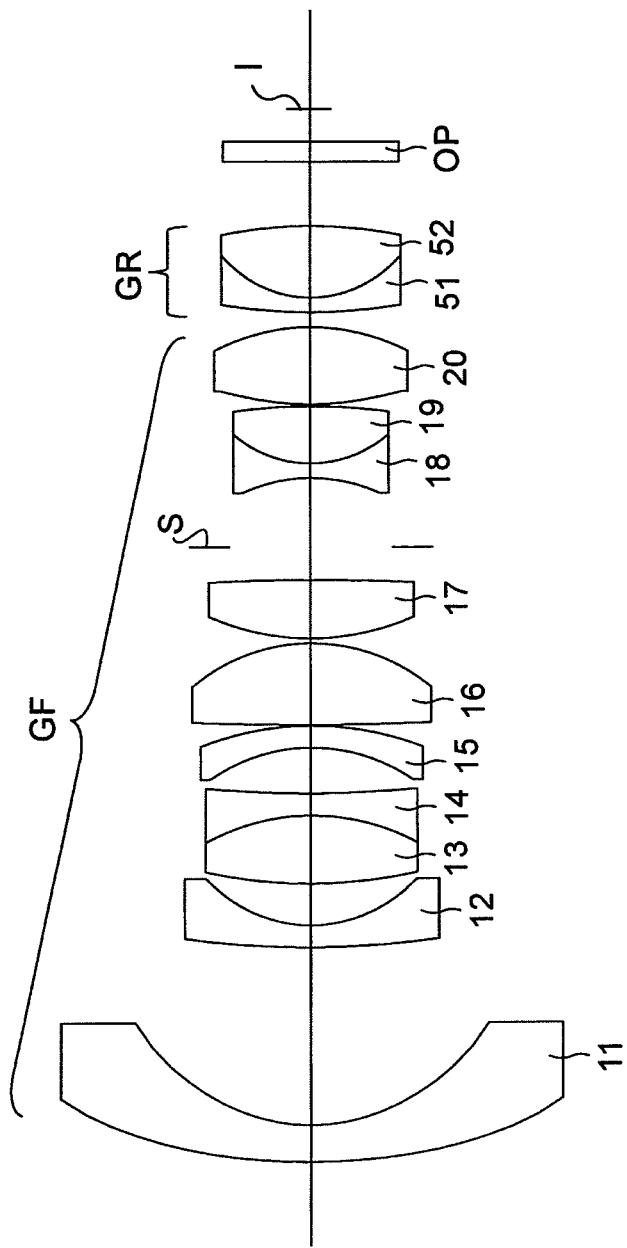
FIG. 4 shows a lens arrangement of a second numerical embodiment of a superwide-angle lens system, according to the present invention, when focused on an object at infinity.

FIGS. 4 through 6D and Tables 4 through 6 show a second numerical embodiment of the superwide-angle lens system according to the present invention. FIG. 4 shows a lens arrangement of the second numerical embodiment of the superwide-angle lens system when focused on an object at infinity. FIGS. 5A, 5B, 5C and 5D show various aberrations that occurred in the lens arrangement shown in FIG. 4. FIGS. 6A, 6B, 6C and 6D show lateral aberrations that occurred in the lens arrangement shown in FIG. 4. Table 4 shows the lens surface data. Table 5 shows the aspherical surface data. Table 6 shows various lens system data.

The fundamental lens arrangement of the second numerical embodiment is the same as that of the first numerical embodiment except for the following (1):

(1) The positive front lens group GF is configured of a negative meniscus lens element 11 having a convex surface on the object side, a negative meniscus lens element 12 having a convex surface on the object side, a cemented lens provided with a biconvex positive lens element 13 and a biconcave negative lens element 14; a negative meniscus lens element 15 having a convex surface on the image side, a biconvex positive lens element 16, a biconvex positive lens element 17, a diaphragm S, a cemented lens provided with a biconcave negative lens element 18 and a biconvex positive lens element 19; and a biconvex positive lens element 20, in that order from the object side (eight lens groups, ten lens elements). An aspherical surface is formed on each side of the negative meniscus lens element 11 which is provided closest to the object side within the front lens group GF, and an aspherical surface is formed on each side of the biconvex positive lens element 20 which is provided closest to the image side within the front lens group GF.

TABLE 4

SURFACE DATA

| Surf. No. | R | d | N (d) | ν (d) |
|---|---|---|---|---|
| 1* | 40.155 | 2.000 | 1.74330 | 49.3 |
| 2* | 10.653 | 9.683 | | |
| 3 | 52.398 | 1.200 | 1.83481 | 42.7 |
| 4 | 8.057 | 2.292 | | |
| 5 | 27.930 | 3.725 | 1.76182 | 26.6 |
| 6 | −12.554 | 1.200 | 1.61800 | 63.4 |
| 7 | 64.216 | 2.490 | | |
| 8 | −10.200 | 1.200 | 1.92286 | 20.9 |

TABLE 4-continued

SURFACE DATA

| Surf. No. | R | d | N (d) | ν (d) |
|---|---|---|---|---|
| 9 | −17.579 | 0.050 | | |
| 10 | 182.905 | 4.465 | 1.48749 | 70.4 |
| 11 | −10.556 | 0.264 | | |
| 12 | 14.453 | 3.202 | 1.70154 | 41.2 |
| 13 | −119.410 | 1.800 | | |
| 14 (Diaphragm) | ∞ | 3.755 | | |
| 15 | −9.413 | 0.800 | 1.67270 | 32.2 |
| 16 | 6.823 | 3.121 | 1.49700 | 81.6 |
| 17 | −32.893 | 0.100 | | |
| 18* | 15.690 | 4.228 | 1.85135 | 40.1 |
| 19* | −11.315 | 0.800 | | |
| 20 | 30.711 | 0.800 | 1.90366 | 31.3 |
| 21 | 6.671 | 3.879 | 1.48749 | 70.4 |
| 22 | −26.371 | 3.500 | | |
| 23 | ∞ | 1.100 | 1.51633 | 64.1 |
| 24 | ∞ | — | | |

TABLE 5

Aspherical Surface Data (Coefficients not shown are zero (0.0):

| Surf. No. | K | A4 | A6 | A8 | A10 |
|---|---|---|---|---|---|
| 1 | 0.000 | 0.3523E−04 | −0.1923E−06 | 0.6168E−09 | 0.4222E−12 |
| 2 | 0.000 | −0.4548E−04 | −0.3101E−06 | −0.4656E−08 | |
| 18 | 0.000 | −0.1886E−03 | −0.4690E−06 | 0.3141E−07 | |
| 19 | 0.000 | 0.1764E−03 | −0.3255E−05 | 0.3383E−07 | |

TABLE 6

LENS SYSTEM DATA

| FNO. | 1.4 |
|---|---|
| f | 4.28 |
| W | 50.8 |
| Y | 5.00 |
| fB | 2.43 |
| L | 58.08 |

Numerical Embodiment 3

Figure 7:
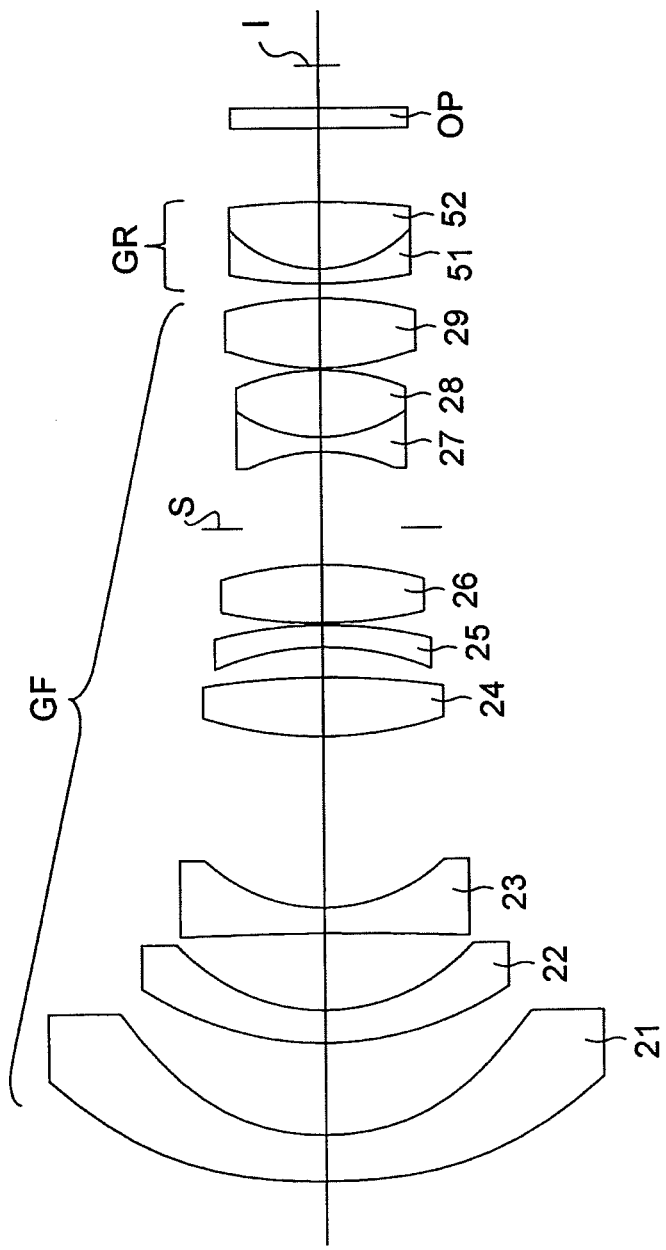
FIG. 7 shows a lens arrangement of a third numerical embodiment of a superwide-angle lens system, according to the present invention, when focused on an object at infinity.

FIGS. 7 through 9D and Tables 7 through 9 show a third numerical embodiment of the superwide-angle lens system according to the present invention. FIG. 7 shows a lens arrangement of the third numerical embodiment of the super-wide-angle lens system when focused on an object at infinity. FIGS. 8A, 8B, 8C and 8D show various aberrations that occurred in the lens arrangement shown in FIG. 7. FIGS. 9A, 9B, 9C and 9D show lateral aberrations that occurred in the lens arrangement shown in FIG. 7. Table 7 shows the lens surface data. Table 8 shows the aspherical surface data. Table 9 shows various lens system data.

The fundamental lens arrangement of the third numerical embodiment is the same as that of the first numerical embodiment except for the following (1):

(1) The positive front lens group GF is configured of a negative meniscus lens element 21 having a convex surface on the object side, a negative meniscus lens element 22 having a convex surface on the object side, a biconcave negative lens element 23, a biconvex positive lens element 24, a negative meniscus lens element 25 having a convex surface on the image side, a biconvex positive lens element 26, a diaphragm S, a cemented lens provided with a biconcave negative lens element 27 and a biconvex positive lens element 28; and a biconvex positive lens element 29, in that order from the object side (eight lens groups, nine lens elements). An aspherical surface is formed on each side of the negative meniscus lens element 21 which is provided closest to the object side within the front lens group GF, and an aspherical surface is formed on each side of the biconvex positive lens element 29 which is provided closest to the image side within the front lens group GF.

TABLE 7

SURFACE DATA

| Surf. No. | R | d | N (d) | ν (d) |
|---|---|---|---|---|
| 1* | 40.063 | 2.507 | 1.69350 | 53.2 |
| 2* | 13.747 | 5.014 | | |
| 3 | 18.645 | 1.800 | 1.77250 | 49.6 |
| 4 | 11.252 | 4.203 | | |
| 5 | −202.176 | 1.400 | 1.61800 | 63.4 |
| 6 | 9.922 | 9.396 | | |
| 7 | 22.295 | 3.227 | 1.90366 | 31.3 |
| 8 | −46.657 | 1.659 | | |

TABLE 7-continued

SURFACE DATA

| Surf. No. | R | d | N (d) | ν (d) |
|---|---|---|---|---|
| 9 | −15.830 | 1.200 | 1.84666 | 23.8 |
| 10 | −24.909 | 0.111 | | |
| 11 | 26.158 | 3.200 | 1.48749 | 70.4 |
| 12 | −20.155 | 2.000 | | |
| 13 (Diaphragm) | ∞ | 4.191 | | |
| 14 | −9.640 | 0.800 | 1.67270 | 32.2 |
| 15 | 8.529 | 3.642 | 1.49700 | 81.6 |
| 16 | −12.227 | 0.100 | | |
| 17* | 13.218 | 3.808 | 1.85135 | 40.1 |
| 18* | −21.329 | 0.800 | | |
| 19 | 26.725 | 0.800 | 1.90366 | 31.3 |
| 20 | 7.000 | 3.651 | 1.48749 | 70.4 |
| 21 | −45.945 | 4.000 | | |
| 22 | ∞ | 1.100 | 1.51633 | 64.1 |
| 23 | ∞ | — | | |

TABLE 8

Aspherical Surface Data (Coefficients not shown are zero (0.0):

| Surf. No. | K | A4 | A6 | A8 |
|---|---|---|---|---|
| 1 | 0.000 | 0.8835E−04 | −0.2794E−06 | 0.4034E−09 |
| 2 | 0.000 | 0.8188E−04 | 0.2279E−06 | −0.4562E−08 |
| 17 | 0.000 | −0.1464E−03 | −0.4667E−06 | |
| 18 | 0.000 | 0.3429E−05 | −0.9581E−06 | |

TABLE 9

LENS SYSTEM DATA

| | |
|---|---|
| FNO. | 1.4 |
| f | 4.40 |
| W | 50.1 |
| Y | 5.00 |
| fB | 2.01 |
| L | 60.62 |

Numerical Embodiment 4

Figure 10:
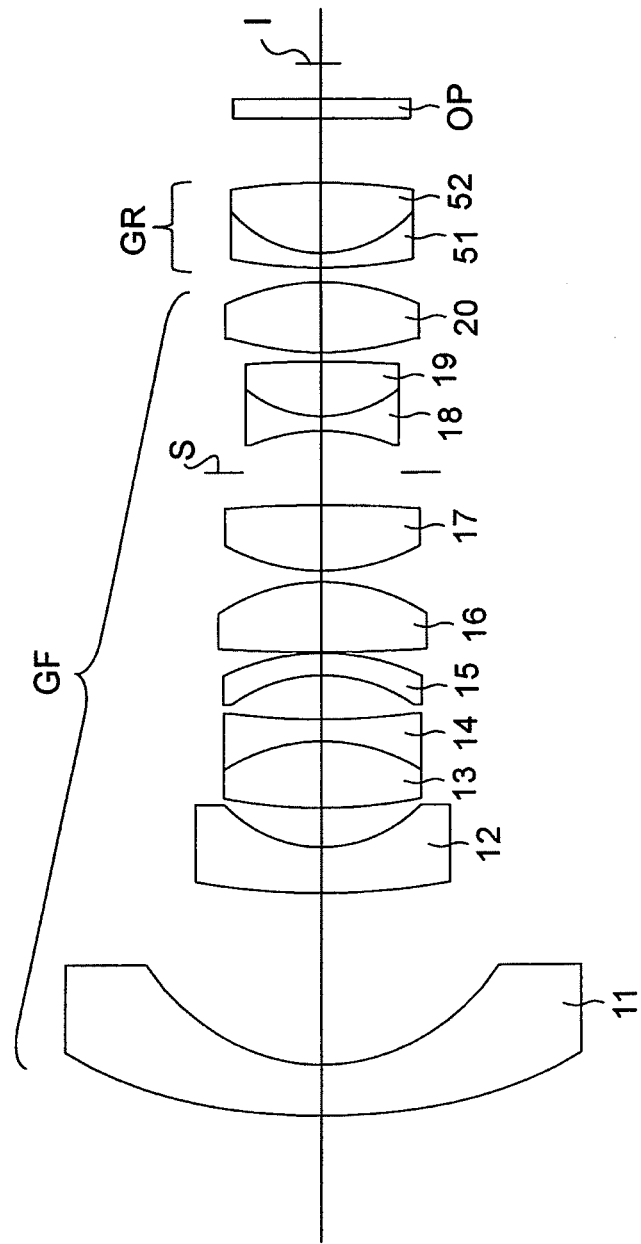
FIG. 10 shows a lens arrangement of a fourth numerical embodiment of a superwide-angle lens system, according to the present invention, when focused on an object at infinity.
Figures 11A, 11B, 11C, 11D:
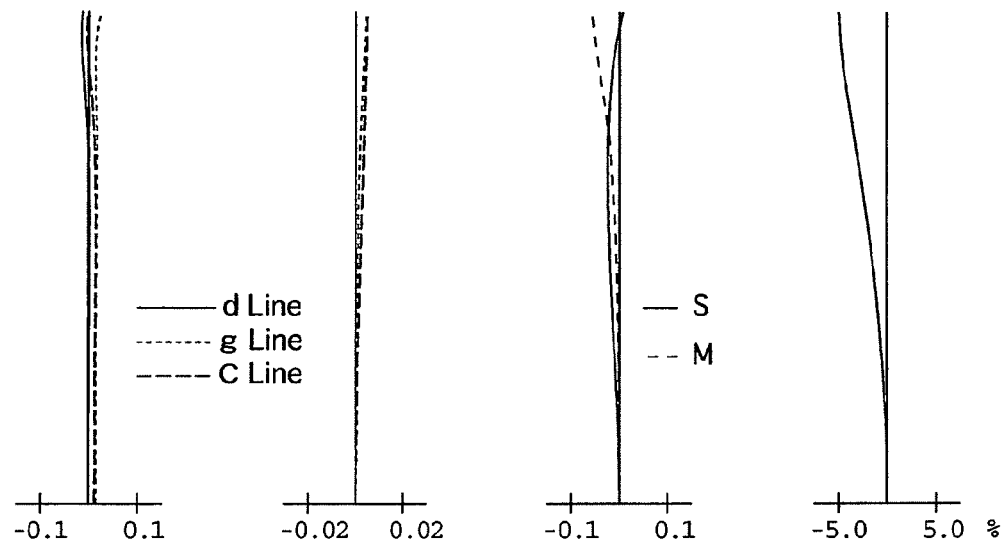
FIGS. 11A, 11B, 11C and 11D show various aberrations that occurred in the lens arrangement shown in FIG. 10.
Figure 12A:
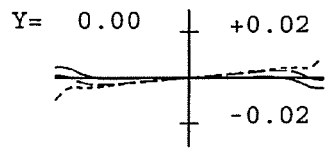
FIGS. 12A, 12B, 12C and 12D show lateral aberrations that occurred in the lens arrangement shown in FIG. 10.
Figure 12B:
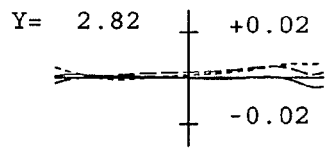
Figure 12C:
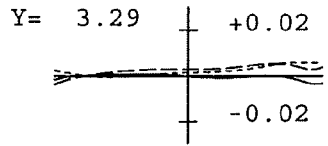
Figure 12D:
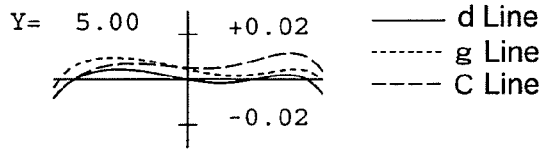

FIGS. 10 through 12D and Tables 10 through 12 show a fourth numerical embodiment of the superwide-angle lens system according to the present invention. FIG. 10 shows a lens arrangement of the fourth numerical embodiment of the superwide-angle lens system when focused on an object at infinity. FIGS. 11A, 11B, 11C and 11D show various aberrations that occurred in the lens arrangement shown in FIG. 10. FIGS. 12A, 12B, 12C and 12D show lateral aberrations that occurred in the lens arrangement shown in FIG. 10. Table 10 shows the lens surface data. Table 11 shows the aspherical surface data. Table 12 shows various lens system data.

The fundamental lens arrangement of the fourth numerical embodiment is the same as that of the second numerical embodiment.

TABLE 10

SURFACE DATA

| Surf. No. | R | d | N (d) | ν (d) |
|---|---|---|---|---|
| 1* | 44.139 | 2.747 | 1.77250 | 49.6 |
| 2* | 10.844 | 9.343 | | |
| 3 | 41.777 | 2.500 | 1.83481 | 42.7 |
| 4 | 7.598 | 2.147 | | |
| 5 | 28.684 | 3.662 | 1.75520 | 27.5 |
| 6 | −10.352 | 1.200 | 1.61800 | 63.4 |
| 7 | 38.906 | 2.414 | | |
| 8 | −8.814 | 1.212 | 1.92286 | 20.9 |
| 9 | −12.839 | 0.050 | | |
| 10 | 98.160 | 3.846 | 1.51680 | 64.2 |
| 11 | −10.592 | 0.618 | | |
| 12 | 11.336 | 3.610 | 1.53172 | 48.8 |
| 13 | −73.798 | 1.800 | | |
| 14 (Diaphragm) | ∞ | 2.275 | | |
| 15 | −10.617 | 0.800 | 1.68893 | 31.2 |
| 16 | 6.920 | 2.980 | 1.49700 | 81.6 |
| 17 | −65.938 | 0.494 | | |
| 18* | 14.972 | 3.851 | 1.85135 | 40.1 |
| 19* | −12.112 | 0.800 | | |
| 20 | 27.352 | 0.800 | 1.90366 | 31.3 |
| 21 | 6.804 | 3.835 | 1.48749 | 70.4 |
| 22 | −34.388 | 3.500 | | |
| 23 | ∞ | 1.050 | 1.51633 | 64.1 |
| 24 | ∞ | — | | |

TABLE 11

Aspherical Surface Data (Coefficients not shown are zero (0.0):

| Surf. No. | K | A4 | A6 | A8 | A10 |
|---|---|---|---|---|---|
| 1 | 0.000 | 0.3934E−04 | −0.1607E−06 | 0.3717E−09 | 0.2933E−12 |
| 2 | 0.000 | −0.2946E−04 | −0.6468E−07 | −0.5532E−08 | |
| 18 | 0.000 | −0.2132E−03 | −0.3463E−06 | 0.2932E−07 | |
| 19 | 0.000 | 0.1445E−03 | −0.3011E−05 | 0.3533E−07 | |

TABLE 12

LENS SYSTEM DATA

| | |
|---|---|
| FNO. | 1.4 |
| f | 4.28 |
| W | 50.8 |
| Y | 5.00 |
| fB | 2.52 |
| L | 58.05 |

Numerical Embodiment 5

Figure 13:
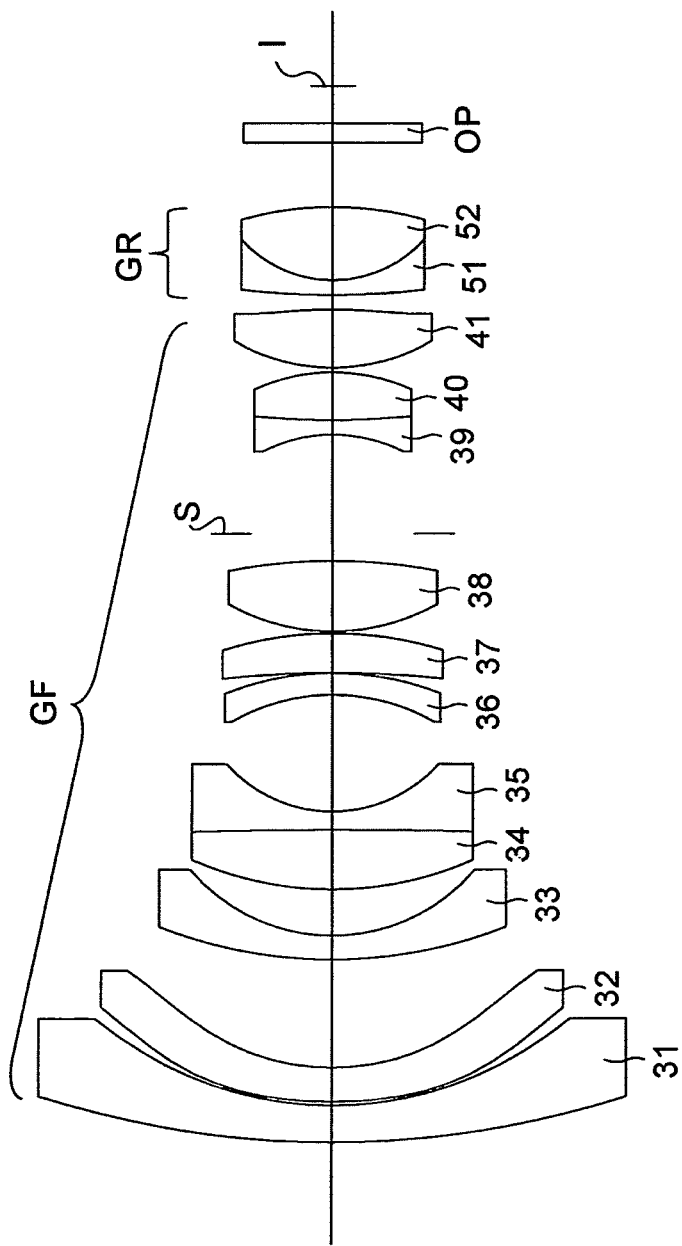
FIG. 13 shows a lens arrangement of a fifth numerical embodiment of a superwide-angle lens system, according to the present invention, when focused on an object at infinity.
Figures 14A, 14B, 14C, 14D:
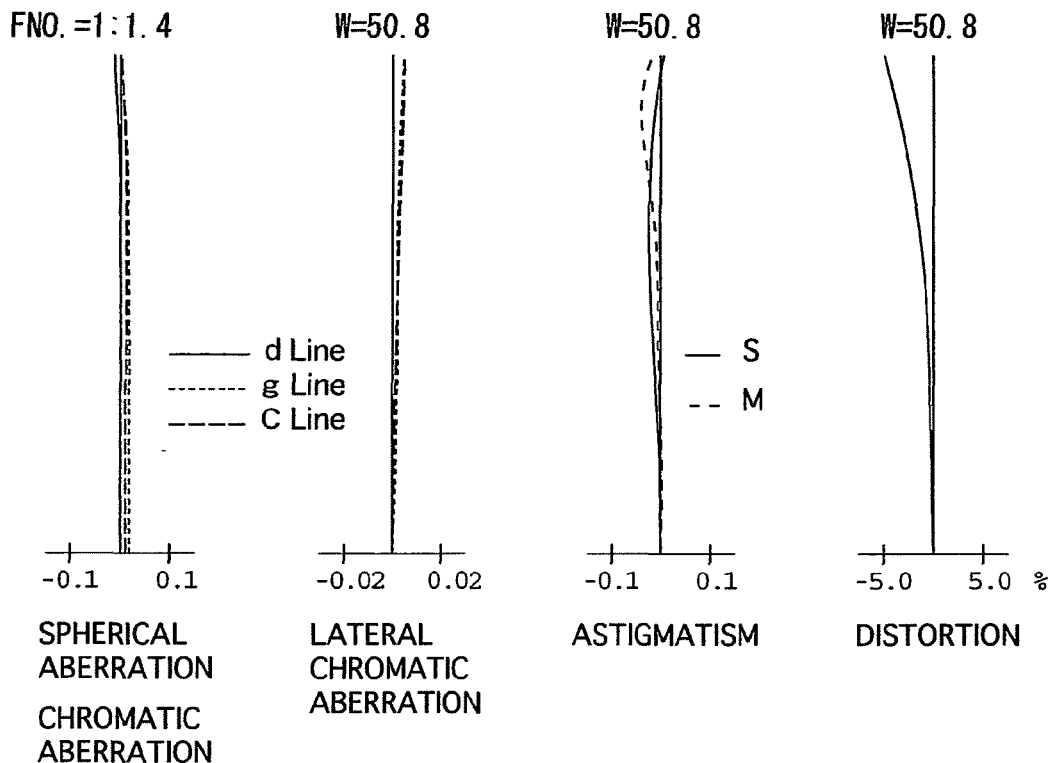
FIGS. 14A, 14B, 14C and 14D show various aberrations that occurred in the lens arrangement shown in FIG. 13.
Figure 15A:
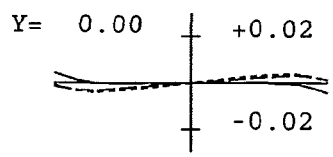
FIGS. 15A, 15B, 15C and 15D show lateral aberrations that occurred in the lens arrangement shown in FIG. 13.
Figure 15B:
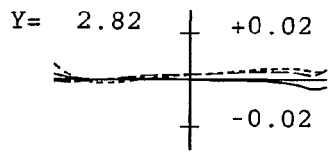
Figure 15C:
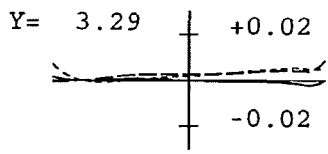
Figure 15D:
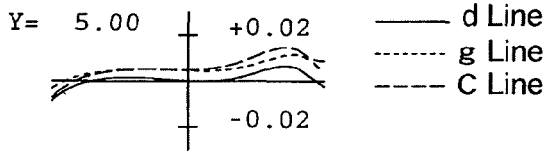

FIGS. 13 through 15D and Tables 13 through 15 show a fifth numerical embodiment of the superwide-angle lens system according to the present invention. FIG. 13 shows a lens arrangement of the fifth numerical embodiment of the superwide-angle lens system when focused on an object at infinity. FIGS. 14A, 14B, 14C and 14D show various aberrations that occurred in the lens arrangement shown in FIG. 13. FIGS. 15A, 15B, 15C and 15D show lateral aberrations that occurred in the lens arrangement shown in FIG. 13. Table 13 shows the lens surface data. Table 14 shows the aspherical surface data. Table 15 shows various lens system data.

The fundamental lens arrangement of the fifth numerical embodiment is the same as that of the first numerical embodiment except for the following (1):

(1) The positive front lens group GF is configured of a negative meniscus lens element 31 having a convex surface on the object side, a negative meniscus lens element 32 having a convex surface on the object side, a negative meniscus lens element 33 having a convex surface on the object side, a cemented lens provided with a biconvex positive lens element 34 and a biconcave negative lens element 35; a negative meniscus lens element 36 having a convex surface on the image side, a positive meniscus lens element 37 having a convex surface on the image side, a biconvex positive lens element 38, a diaphragm S, a cemented lens provided with a biconcave negative lens element 39 and a biconvex positive lens element 40; and a biconvex positive lens element 41, in that order from the object side (nine lens groups, eleven lens elements). An aspherical surface is formed on each side of the negative meniscus lens element 32 which is provided second from the closest to the object side within the front lens group GF, and an aspherical surface is formed on each side of the biconvex positive lens element 41 which is provided closest to the image side within the front lens group GF.

TABLE 13

SURFACE DATA

| Surf. No. | R | d | N (d) | ν (d) |
|---|---|---|---|---|
| 1 | 54.556 | 2.000 | 1.77250 | 49.6 |
| 2 | 20.899 | 0.200 | | |

TABLE 13-continued

SURFACE DATA

| Surf. No. | R | d | N (d) | ν (d) |
|---|---|---|---|---|
| 3* | 28.869 | 1.854 | 1.69350 | 53.2 |
| 4* | 14.454 | 5.882 | | |
| 5 | 27.128 | 1.300 | 1.83481 | 42.7 |
| 6 | 10.531 | 2.521 | | |
| 7 | 19.785 | 3.239 | 1.84666 | 23.8 |
| 8 | −299.469 | 1.000 | 1.49700 | 81.6 |
| 9 | 8.028 | 6.399 | | |
| 10 | −11.451 | 1.200 | 1.84666 | 23.8 |
| 11 | −16.384 | 0.000 | | |
| 12 | −60.150 | 2.183 | 1.80420 | 46.5 |
| 13 | −20.674 | 0.100 | | |
| 14 | 12.066 | 3.858 | 1.51680 | 64.2 |
| 15 | −31.020 | 1.500 | | |
| 16 (Diaphragm) | ∞ | 5.442 | | |
| 17 | −8.631 | 0.800 | 1.69895 | 30.0 |
| 18 | 45.655 | 2.624 | 1.49700 | 81.6 |
| 19 | −10.592 | 0.257 | | |
| 20* | 11.267 | 3.170 | 1.85135 | 40.1 |
| 21* | −28.069 | 0.800 | | |
| 22 | 46.443 | 0.800 | 1.90366 | 31.3 |
| 23 | 6.967 | 4.006 | 1.48749 | 70.4 |
| 24 | −18.808 | 3.500 | | |
| 25 | ∞ | 1.050 | 1.51633 | 64.1 |
| 26 | ∞ | — | | |

TABLE 14

Aspherical Surface Data:

| Surf. No. | K | A4 | A6 | A8 | A10 |
|---|---|---|---|---|---|
| 3 | 0.000 | 0.1855E−03 | −0.1162E−05 | 0.5208E−08 | −0.1299E−10 |
| 4 | 0.000 | 0.1524E−03 | −0.1336E−05 | 0.4855E−09 | −0.2753E−11 |
| 20 | 0.000 | −0.4937E−04 | 0.2030E−05 | −0.3320E−07 | 0.2404E−08 |
| 21 | 0.000 | 0.2683E−03 | 0.1130E−05 | −0.5403E−07 | 0.3903E−08 |

TABLE 15

LENS SYSTEM DATA

| FNO. | 1.4 |
|---|---|
| f | 4.28 |
| W | 50.8 |
| Y | 5.00 |
| fB | 2.39 |
| L | 58.08 |

The numerical values of each condition for each embodiment are shown in Table 16.

TABLE 16

| | Embod. 1 | Embod. 2 | Embod. 3 | Embod. 4 | Embod. 5 |
|---|---|---|---|---|---|
| Cond. (1) | 1.16 | 1.15 | 1.14 | 1.14 | 1.17 |
| Cond. (2) | −29.1 | −21.8 | −18.9 | −21.6 | −24.2 |
| Cond. (3) | −1.60 | −1.50 | −1.67 | −1.43 | −1.47 |
| Cond. (4) | 33.3 | 26.6 | 31.3 | 27.5 | 23.8 |

As can be understood from Table 16, the first through fifth numerical embodiments satisfy conditions (1) through (4). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A superwide-angle lens system comprising a positive front lens group and a negative rear lens group, in that order from the object side, wherein said negative rear lens group serves as a focusing lens group that is moved in the optical axis direction when focusing on an object at infinity to an object at a finite distance,
wherein the following condition is satisfied:

$$1.1 < mR < 2.0,$$

wherein
mR designates the lateral magnification of said negative rear lens group when focusing on an object at infinity.

2. The superwide-angle lens system according to claim 1, wherein the following condition is satisfied:

$$-30 < fR/fF < -11,$$

wherein
fR designates the focal length of said negative rear lens group, and
fF designates the focal length of said positive front lens group.

3. The superwide-angle lens system according to claim 1, wherein said positive front lens group includes at least two negative single lens elements which are consecutively provided from a position closest to the object side.

4. The superwide-angle lens system according to claim 3, wherein the following condition is satisfied:

$$-2.0 < fn/fF < -1.3,$$

wherein
fn designates the combined focal length of said at least two negative single lens elements which are consecutively provided from the position closest to the object side within said positive front lens group, and
fF designates the focal length of said positive front lens group.

5. The superwide-angle lens system according to claim 1, wherein said negative rear lens group comprises a cemented lens provided with one negative lens element and one positive lens element.

6. The superwide-angle lens system according to claim 1, wherein the following condition is satisfied:

$$20 < vd < 35,$$

wherein
vd designates the Abbe number with respect to the d-line of the positive lens element provided closest to the object side within said positive front lens group.

* * * * *